(12) United States Patent
Takemura et al.

(10) Patent No.: US 7,441,614 B2
(45) Date of Patent: Oct. 28, 2008

(54) LEGGED MOBILE ROBOT

(75) Inventors: Yoshinari Takemura, Wako (JP);
Tadaaki Hasegawa, Wako (JP);
Takafumi Fukushima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 353 days.

(21) Appl. No.: 10/554,267

(22) PCT Filed: May 18, 2004

(86) PCT No.: PCT/JP2004/007064

§ 371 (c)(1),
(2), (4) Date: Oct. 24, 2005

(87) PCT Pub. No.: WO2004/103650

PCT Pub. Date: Dec. 2, 2004

(65) Prior Publication Data
US 2006/0243498 A1    Nov. 2, 2006

(30) Foreign Application Priority Data
May 20, 2003 (JP) .............................. 2003-141461

(51) Int. Cl.
*B62D 51/06* (2006.01)
(52) U.S. Cl. .......................... 180/8.1; 180/8.6; 180/8.5; 901/1; 901/701
(58) Field of Classification Search ................... 180/8.1, 180/8.6, 8.5; 901/1, 701
See application file for complete search history.

(56) References Cited

U.S. PATENT DOCUMENTS

| 6,301,524 B1 * | 10/2001 | Takenaka ..................... 700/245 |
| 6,538,410 B2 * | 3/2003 | Mori et al. ............. 318/568.12 |
| 6,802,382 B2 * | 10/2004 | Hattori et al. ................. 180/8.6 |
| 6,969,965 B2 * | 11/2005 | Takenaka et al. ....... 318/568.12 |
| 6,979,969 B2 * | 12/2005 | Iribe et al. ............. 318/568.12 |
| 7,013,201 B2 * | 3/2006 | Hattori et al. ............... 700/245 |
| 7,099,747 B2 * | 8/2006 | Mikami et al. ............. 700/245 |
| 7,112,938 B2 * | 9/2006 | Takenaka et al. ....... 318/568.12 |

FOREIGN PATENT DOCUMENTS

| JP | 2592340 B2 | 12/1996 |
| JP | 2001-62761 A | 3/2001 |
| JP | 2001-150371 A | 6/2001 |

* cited by examiner

*Primary Examiner*—Lesley D. Morris
*Assistant Examiner*—Marlon A Arce Diaz
(74) *Attorney, Agent, or Firm*—Squire, Sanders & Dempsey L.L.P.

(57) ABSTRACT

In a legged mobile robot, each hip joint that connects a body with a thigh link comprises a first rotary shaft that provides a degree of freedom to rotate about a yaw axis, a second rotary shaft that provides a degree of freedom to rotate about a roll axis, and a third rotary shaft that provides a degree of freedom to rotate about a pitch axis, and in addition thereto, a fourth rotary shaft that provides a redundant degree of freedom. Owing to this configuration, the amount of body bending and the movable range of the legs can be increased, thereby improving the degree of posture and gait freedom.

14 Claims, 8 Drawing Sheets

LEGGED MOBILE ROBOT

TECHNICAL FIELD

This invention relates to a legged mobile robot, particularly to the hip joint structure of a legged mobile robot.

BACKGROUND ART

As examples of technologies concerning hip joint structures for legged mobile robots are known from Japanese Patent Publication No. 2592340 ('340) and Japanese Laid-Open Application Nos. 2001-62761 ('761) and 2001-150371 ('371). In '340 (especially at pages 4 and 5 and FIG. 2), there is taught a configuration in which the motors for driving the hip joints are disposed on the body side so as to reduce weight toward the distal ends of the legs and lower the inertial moment produced in the legs.

The teaching of '761 (especially at paragraphs 0053 to 0055 and FIG. 12) relates to a configuration in which the hip joints are provided with a parallel link mechanism with which the right and left legs are connected and the parallel link mechanism is operated at free leg footfall to move the leg upward so as to mitigate the ground impact force.

The teaching of '371 (especially at 0070 to 0086 and FIGS. 5 and 7) relates to a configuration in which each rotary shaft providing the degree of freedom to rotate about the yaw axis among the degrees of freedom of the hip joints is offset relative to the roll axis direction to avoid interference between the feet when the robot changes directions of movement.

Aside from the above, in the case where the body of the legged mobile robot is to be bent (i.e., bent forward or backwards), situations sometimes arise in which the desired amount of bending cannot be realized solely within the movable range of the respective shafts that rotate about the pitch axis and the roll axis of the hip joints.

It has therefore been proposed to increase the amount of bending of the body by dividing the body into an upper section and a lower section, connecting the two sections through a joint having a degree of freedom to rotate about the pitch axis and rotating the upper and lower sections relative to each other so as to realize an amount of body bending that is larger than that realized by the movable range of the hip joints (this can be seen by, for example, Kawada Industries, Inc., "'Rise/Lie Actions' Achieved by Humanoid Worker Robot," [online], Sep. 19, 2002, Kawada Industries Homepage, topics, [retrieved May 2, 2003], Internet <URL: http://www.kawada.co.jp/general/topics/020919_hrp-2p.html>).

However, the structure described on the aforesaid website has a problem in that the division of the body into upper and lower sections degrades the ability of the body to accommodate equipment internally.

Moreover, the fact that the movable range of hip joints is deficient means not only that the amount of body bending is deficient but also simultaneously that the movable range of the legs cannot be increased. In the technology described on the website, the amount of bending of the body is increased by equipping the body with the joint, which does nothing to increase the moveable range of legs, so that no improvement is achieved in the degree of posture and gait freedom of the whole robot including its lower part.

DISCLOSURE OF INVENTION

An object of this invention is therefore to provide a legged mobile robot configured to increase the amount of body bending and the movable range of the legs, thereby improving the degree of posture and gait freedom, without degrading the ability of the body to accommodate equipment internally.

In order to achieve the object, as recited in claim 1 mentioned below, this invention is configured to have a legged mobile robot equipped with legs each having a hip joint that connects a body with a thigh link, a knee joint that connects the thigh link with a shank link, and an ankle joint that connects the shank link with a foot to move by driving each leg, in which each of the hip joint comprises a first rotary shaft that provides a degree of freedom to rotate about a yaw axis, a second rotary shaft that provides a degree of freedom to rotate about a roll axis, and a third rotary shaft that provides a degree of freedom to rotate about a pitch axis, and in addition thereto, a fourth rotary shaft that provides a redundant degree of freedom.

Thus, it is configured such that each hip joint connecting the body with the thigh link comprises a first rotary shaft that provides a degree of freedom to rotate about a yaw axis, a second rotary shaft that provides a degree of freedom to rotate about a roll axis, and a third rotary shaft that provides a degree of freedom to rotate about a pitch axis, and in addition thereto, a fourth rotary shaft that provides a redundant degree of freedom. Owing to this configuration, the amount of body bending and the movable range of the legs can be increased, thereby improving the degree of posture and gait freedom, without degrading the ability of the body to accommodate equipment internally.

As recited in claim 2 mentioned below, this invention is configured such that each of the hip joint is further equipped with a first member that is connected to the body through one of the first to third rotary shafts, and a second member that is connected to the thigh link through others of the first to third rotary shafts, and the first member and the second member are connected through the fourth rotary shaft.

Thus, since it is configured such that each hip joint is further equipped with a first member that is connected to the body through one of the first to third rotary shafts, and a second member that is connected to the thigh link through others of the first to third rotary shafts, and the first member and the second member are connected through the fourth rotary shaft, similarly to claim 1, the amount of body bending and the movable range of the legs can be increased, thereby improving the degree of posture and gait freedom.

As recited in claim 3 mentioned below, this invention is configured such that the fourth rotary shaft is a shaft that is not parallel to the yaw axis.

Thus, since it is configured such that the fourth rotary shaft is a shaft that is not parallel to the yaw axis, similarly to claim 1, the amount of body bending and the movable range of the legs can be increased, thereby improving the degree of posture and gait freedom.

As recited in claim 4 mentioned below, this invention is configured such that the fourth rotary shaft is situated forward of the first rotary shaft in a direction of the roll axis.

Thus, since it is configured such that the fourth rotary shaft is situated forward of the first rotary shaft in a direction of the roll axis, in addition to the effects and advantages mentioned above, this makes it easy to bend the body forward.

As recited in claim 5 mentioned below, this invention is configured to further include a first rotary shaft motor that drives the first rotary shaft and a first rotary shaft speed reducer that reduces an output of the first rotary shaft motor in speed, and output shafts of the first rotary shaft motor and the first rotary shaft speed reducer are situated to be coaxial with the first rotary shaft.

Thus, since it is configured to further include a first rotary shaft motor that drives the first rotary shaft and a first rotary shaft speed reducer that reduces an output of the first rotary shaft motor in speed, and output shafts of the first rotary shaft motor and the first rotary shaft speed reducer are situated to be coaxial with the first rotary shaft, in addition to the effects and advantages mentioned above, the structure of the motor output transmission concerning the first rotary shaft can be made compact.

As recited in claim 6 mentioned below, this invention is configured to further include a second rotary shaft motor that drives the second rotary shaft and a second rotary shaft speed reducer that reduces an output of the second rotary shaft motor in speed, and output shafts of the second rotary shaft motor and the second rotary shaft speed reducer are situated to be coaxial with the second rotary shaft.

Thus, since it is configured such that it further include a second rotary shaft motor that drives the second rotary shaft and a second rotary shaft speed reducer that reduces an output of the second rotary shaft motor in speed, and output shafts of the second rotary shaft motor and the second rotary shaft speed reducer are situated to be coaxial with the second rotary shaft, in addition to the effects and advantages mentioned above, the structure of the motor output transmission concerning the second rotary shaft can be made compact.

As recited in claim 7 mentioned below, this invention is configured to further includes a third rotary shaft motor that drives the third rotary shaft and a third rotary shaft speed reducer that reduces an output of the third rotary shaft motor in speed, and an output shaft of the third rotary shaft speed reducer is situated to be coaxial with the third rotary shaft.

Since it is configured to further includes a third rotary shaft motor that drives the third rotary shaft and a third rotary shaft speed reducer that reduces an output of the third rotary shaft motor in speed, and an output shaft of the third rotary shaft speed reducer is situated to be coaxial with the third rotary shaft, in addition to the effects and advantages mentioned above, the structure of the motor output transmission concerning the third rotary shaft can be made compact. Moreover, since the output shaft of the third rotary shaft speed reducer and the third rotary shaft are made coaxial, other transmission element required for driving the third rotary shaft is only that situated between the third rotary shaft motor and the third rotary shaft speed reducer. Since it suffices if this transmission element can transmit a small driving force before reduced in speed (i.e., the output of the third rotary shaft motor) to the third rotary shaft speed reducer, its torque capacity can be made small. With this, since a relatively light transmission element can be used, even if an axial-to-axial distance between the motor and speed reducer is increased and the transmission element is elongated, the weight will not grow markedly, thereby improving the degree of freedom of positioning of the third rotary shaft motor.

As recited in claim 8 mentioned below, this invention is configured to further include a fourth rotary shaft motor that drives the fourth rotary shaft, and the fourth rotary shaft motor is situated at a same position as the fourth rotary shaft or at a position closer to the body than the fourth rotary shaft.

Since it is configured to further include a fourth rotary shaft motor that drives the fourth rotary shaft, and the fourth rotary shaft motor is situated at a same position as the fourth rotary shaft or at a position closer to the body than the fourth rotary shaft, it becomes possible to reduce the inertial moment produced in the leg when the fourth rotary shaft is driven, as the fourth rotary shaft motor is not subject of rotation of the fourth rotary shaft.

As recited in claim 9 mentioned below, this invention is configured to further include a fourth rotary shaft speed reducer that reduces an output of the fourth rotary shaft motor in speed, and an output shaft of the fourth rotary shaft speed reducer is situated to be coaxial with the fourth rotary shaft.

Since it is configured to further includes a fourth rotary shaft speed reducer that reduces an output of the fourth rotary shaft motor in speed, and an output shaft of the fourth rotary shaft speed reducer is situated to be coaxial with the fourth rotary shaft, in addition to the effects and advantages mentioned above, the structure of the motor output transmission concerning the fourth rotary shaft can be made compact. Moreover, since the output shaft of the fourth rotary shaft speed reducer and the fourth rotary shaft are made coaxial, other transmission element required for driving the fourth rotary shaft is only that situated between the fourth rotary shaft motor and the fourth rotary shaft speed reducer. Since it suffices if this transmission element can transmit a small driving force before reduced in speed (i.e., the output of the fourth rotary shaft motor) to the fourth rotary shaft speed reducer, its torque capacity can be made small. With this, since a relatively light transmission element can be used, even if an axial-to-axial distance between the motor and speed reducer is increased and the transmission element is elongated, the weight will not grow markedly, thereby improving the degree of freedom of positioning of the fourth rotary shaft motor.

As recited in claim 10 mentioned below, this invention is configured to further include a second rotary shaft motor that drives the second rotary shaft and a fourth rotary shaft motor that drives the fourth rotary shaft, and the second member is connected with the thigh link through at least the second rotary shaft such that the fourth rotary shaft motor is situated toward a side of the body from the second rotary shaft motor.

Since it is configured such that the second member is connected with the thigh link through at least the second rotary shaft, i.e., the fourth rotary shaft is situated at a position closer to the body than the second rotary shaft, such that the fourth rotary shaft motor is situated toward a side of the body from the second rotary shaft motor, it becomes possible to reduce the weight toward the distal end of the leg (the center of gravity of the leg can be moved away from the distal end) and to reduce the inertial moment produced in the leg during moving of the robot. Specifically, by situating the fourth rotary shaft at a position closer to the body than the second rotary shaft, the number of members rotated by the fourth rotary shaft becomes larger than the number of members rotated by the second rotary shaft. Since the fourth rotary shaft motor is therefore required to produce more driving power than the second rotary shaft motor, a larger and heavier motor should be used. The mounting of the fourth rotary shaft motor at a position closer to the body than the second rotary shaft motor makes it possible to reduce weight toward the distal end of the leg, thereby reducing the inertial moment produced in the leg during moving of the robot.

As recited in claim 11 mentioned below, this invention is configured to further include a third rotary shaft motor that drives the third rotary shaft and a fourth rotary shaft motor that drives the fourth rotary shaft, and the second member is connected with the thigh link through at least the third rotary shaft such that the fourth rotary shaft motor is situated toward a side of the body from the third rotary shaft motor.

Since it is configured such that the second member is connected with the thigh link through at least the third rotary shaft, i.e., the fourth rotary shaft is situated at a position closer to the body than the third rotary shaft, such that the fourth rotary shaft motor is situated toward a side of the body from the third rotary shaft motor, it becomes possible to reduce the weight toward the distal end of the leg (the center of gravity of the leg can be moved away from the distal end) and to reduce the inertial moment produced in the leg during moving of the robot. Specifically, by situating the fourth rotary shaft at a position closer to the body than the third rotary shaft, the number of members rotated by the fourth rotary shaft becomes larger than the number of members rotated by the third rotary shaft. Since the fourth rotary shaft motor is therefore required to produce more driving power than the third rotary shaft motor, a larger and heavier motor should be used. The mounting of the fourth rotary shaft motor at a position closer to the body than the third rotary shaft motor makes it possible to reduce weight toward the distal end of the leg, thereby reducing the inertial moment produced in the leg during moving of the robot.

As recited in claim 12 mentioned below, this invention is configured such that the fourth rotary shaft motor is situated on a side opposite from the fourth rotary shaft in the direction of the roll axis, sandwiching a center axis of the leg therebetween.

Since it is configured such that the fourth rotary shaft motor is situated on a side opposite from the fourth rotary shaft in the direction of the roll axis, sandwiching a center axis of the leg therebetween, in addition to the effects and advantages mentioned above, the center of gravity balance of the legs can be improved. In addition, no interference arises between the body and fourth rotary shaft motors even when the body bends sharply forward, so that a large amount of forward bending can be achieved.

As recited in claim 13 mentioned below, this invention is configured such that, the first rotary shaft is offset relative to the center axis of the leg in the direction of the roll axis.

Since it is configured such that the first rotary shaft is offset relative to the center axis of the leg in the direction of the roll axis, it becomes possible to minimize interference between the feet when the legs are turned or rotated and to increase the angle of turning of the legs.

As recited in claim 14 mentioned below, this invention is configured such that the second rotary shaft and the third rotary shaft intersect at right angles.

Since it is configured such that the second rotary shaft and the third rotary shaft intersect at right angles, the hip joints can be made compact despite the provision of the fourth rotary shaft to generate the redundant degree of freedom at the hip joints.

BEST MODE FOR CARRYING OUT THE INVENTION

A legged mobile robot according to an embodiment of the present invention will now be explained with reference to the attached drawings.

Figure 1:
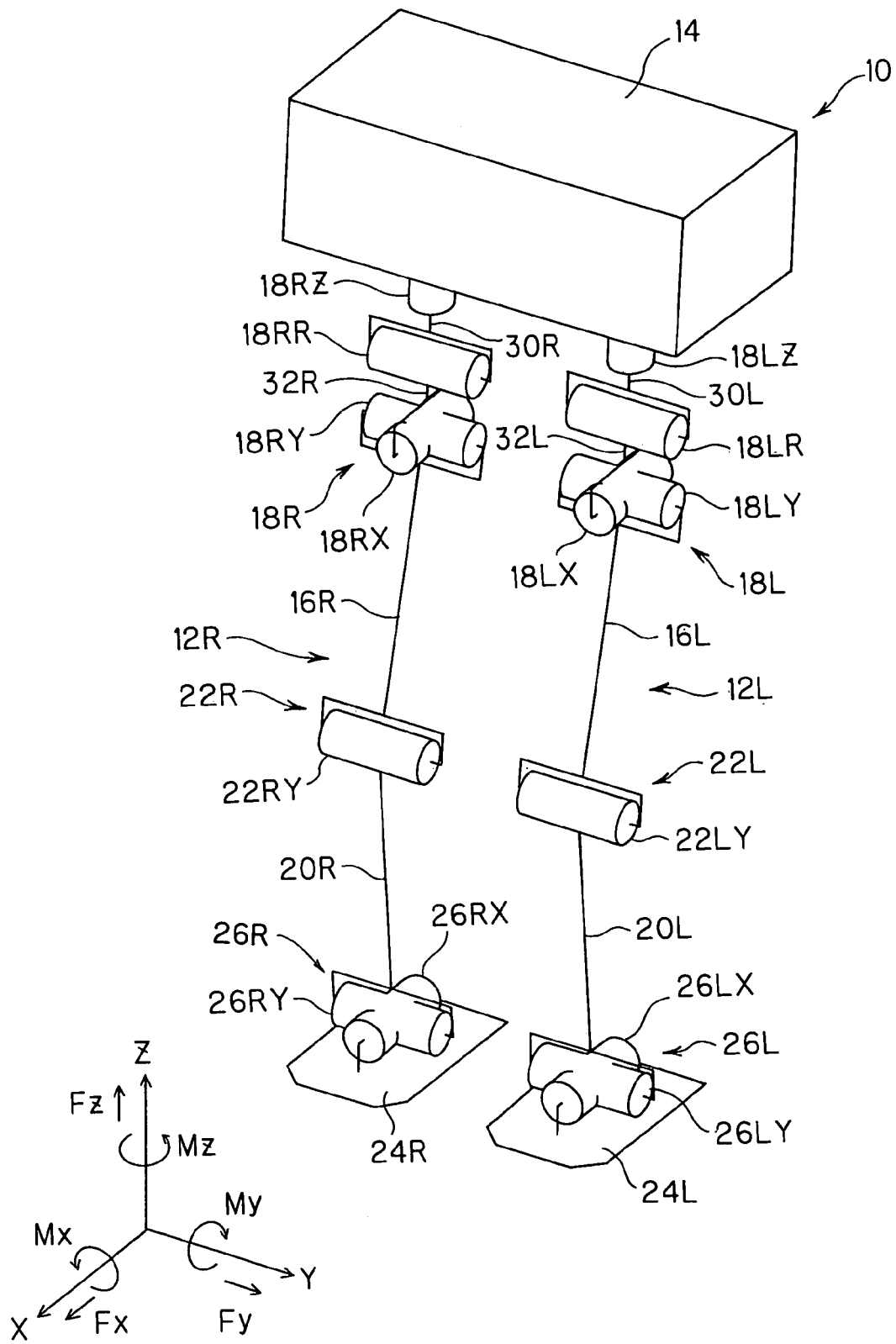
FIG. 1 is a schematic view of a legged mobile robot according to an embodiment of this invention.

FIG. 1 is a schematic view of a legged mobile robot, more exactly a biped robot 10, according to this embodiment.

As shown, the biped robot (hereinafter called simply "robot") 10 is equipped with right and left legs 12R, 12L (R and L indicating Right and Left). The right and left legs 12R, 12L have hip (crotch) joints 18R, 18L that connect a body 14 with thigh links 16R, 16L, knee joints 22R, 22L that connect the thigh links 16R, 16L with shank links 20R, 20L, and ankle joints 26R, 26L that connect the shank links 20R, 20L with feet 24R, 24L.

Each hip joint 18R, 18L has a hip joint yaw shaft 18RZ, 18LZ (the aforesaid first rotary shaft) that provides a degree of freedom to rotate about the yaw axis (Z axis; vertical direction), a hip joint roll shaft 18RX, 18LX (the aforesaid second rotary shaft) that provides a degree of freedom to rotate about the roll axis (X axis; direction of forward movement of the robot 10), a hip joint pitch shaft 18RY, 18LY (the aforesaid third rotary shafts) that provides a degree of freedom to rotate about the pitch axis (Y axis; lateral direction perpendicular to the direction of forward movement of the robot 10 and the vertical direction), and a hip joint redundant shaft 18RR, 18LR (the aforesaid fourth rotary shafts) that provides a redundant degree of freedom to rotate about the pitch axis. As illustrated in FIG. 1, the hip joint roll shaft 18RX, 18LX and the hip joint pitch shaft 18RY, 18LY intersect at right angles.

Each hip joint 18R, 18L is further equipped with a first hip joint link 30R, 30L (the aforesaid first member) that is connected to the body 14 through the hip joint yaw shaft 18RZ, 18LZ, and a second hip joint link 32R, 32L (the aforesaid second members) that is connected to the thigh link 16R, 16L through the hip joint roll shaft 18RX, 18LX and the hip joint pitch shaft 18RY, 18LY. The first hip joint link 30R, 30L and second hip joint link 32R, 32L are connected through the hip joint redundant shaft 18RR, 18LR. In order to avoid an unnatural impression owing to the incorporation of the first hip joint link 30R, 30L and the second hip joint link 32R, 32L in the hip joint 18R, 18L, these members are made shorter than the thigh link 16R, 16L and the shank link 20R, 20L.

Each knee joint 22R, 22L has a knee joint pitch shaft 22RY, 22LY that provides a degree of freedom to rotate about the pitch axis. Each ankle joint 26R, 26L has an ankle joint roll shaft 26RX, 26LX that provides a degree of freedom to rotate about the roll axis and an ankle joint pitch shaft 26RY, 26LY that provides a degree of freedom to rotate about the pitch axis. The aforesaid rotary shafts are driven by electric motors (explained later).

A conventional six-axis force sensor is installed between the ankle joint 26R, 26L and the foot 24R, 24L that measures three directional force components Fx, Fy and Fz and three directional momentum components Mx, My and Mz, so as to detect whether or not the foot of the leg 12R (12L) lands and the floor reaction force acting on the leg 12R (12L) from the floor. An inclination sensor is installed on the body 14 to detect inclination of the robot 10 relative to the Z axis and the angular velocity of the inclination. Each electric motor that drives the associated rotary shaft is equipped with rotary encoder that detects the amount of rotation thereof.

The outputs of the foregoing sensors are sent to a control unit accommodated in the body 14. Based on data stored in memory and the inputted detection values, the control unit calculates control values for the motors that drive the rotary shafts. Since the calculation of the control values is not an essential feature of this invention, neither it nor the aforesaid sensors and control unit to be used therefor will be explained in detail.

The right and left legs 12R, 12L of the robot 10 according to this embodiment are thus each given 7 rotary shafts (degrees of freedom). The legs as a whole can therefore be imparted with desired movements by driving the 14 (=7×2) rotary shafts by the electric motors, thereby enabling to move in three-dimensional space as desired. Although arms and a head can be attached to the body 14 as described in the publication of WO 02/40226A1, these are not directly related to the essential feature of this invention and will therefore not be explained or illustrated here.

The right and left legs 12R, 12L of the robot 10 will now be explained in detail with reference to FIG. 2 onward. Since the right and left legs 12R, 12L are laterally symmetrical, the explanation will therefore be made with respect to only the right leg 12R on the understanding that the explanation also applies to the left leg 12L.

Figure 2:
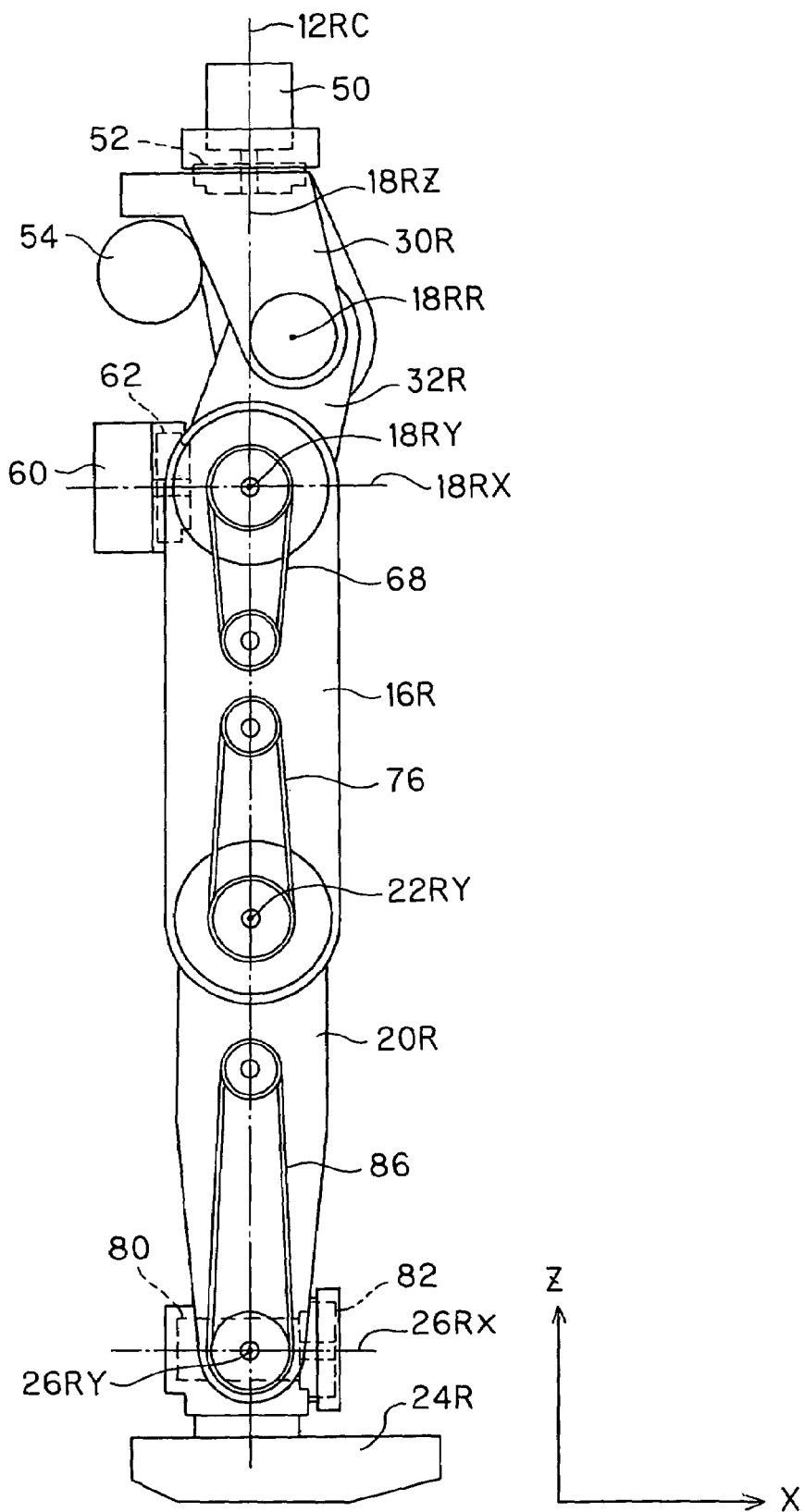
FIG. 2 is a right-side view of the robot illustrated schematically in FIG. 1 showing the structural details of its right leg.
Figure 3:
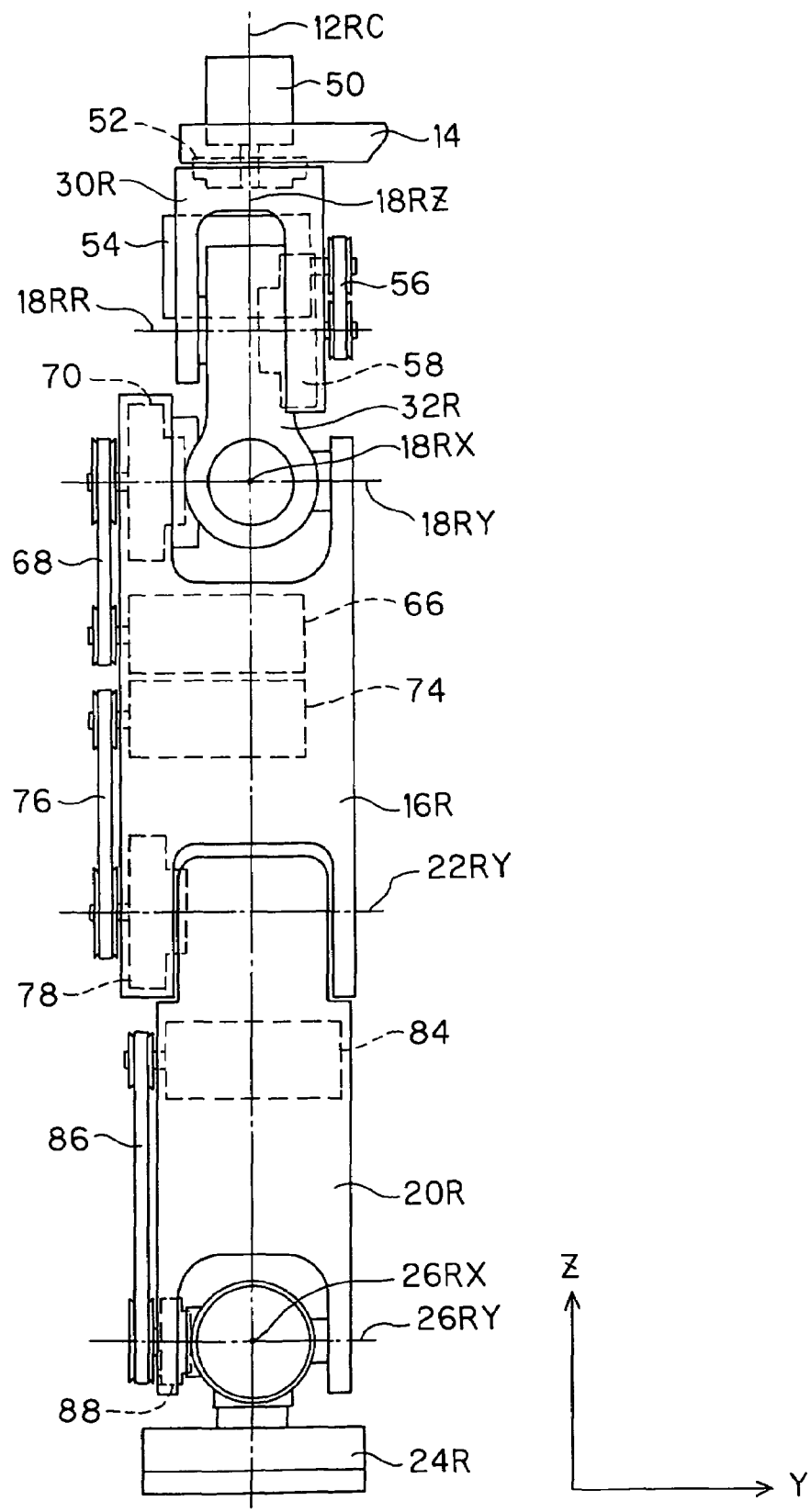
FIG. 3 is a front view of the robot illustrated schematically in FIG. 1 showing the structural details of its right leg.

FIG. 2 is a right-side view showing the structural details of the leg 12R illustrated schematically in FIG. 1. FIG. 3 is a front view showing the structural details of the leg 12R.

As shown in these two drawings, an electric motor (hereinafter referred to as "hip joint yaw shaft motor") 50 that drives the hip joint yaw shaft 18RZ is mounted on the body 14. Note that the hip joint yaw shaft 18RZ is aligned with the center axis 12RC of the leg 12R.

The output shaft of the hip joint yaw shaft motor 50 is directly connected to a speed reducer (hereinafter referred to as "hip joint yaw shaft speed reducer") 52 fastened to the bottom of the body 14, so that the output reduced its speed by the hip joint yaw shaft motor 50 is directly transmitted to the hip joint yaw shaft speed reducer 52. The output shaft of the hip joint yaw shaft speed reducer 52 is situated or installed to be coaxial with the hip joint yaw shaft 18RZ, so that the output reduced its speed by the hip joint yaw shaft speed reducer 52 is directly transmitted to hip joint yaw shaft 18RZ so as to rotate or turn the first hip joint link 30R and the body 14 relatively to one another. The hip joint yaw shaft speed reducer 52 is configured so that its input shaft (i.e., the output shaft of the hip joint yaw shaft motor 50) and output shaft are situated to be coaxial with each other. In other words, the output shafts of the hip joint yaw shaft motor 50 and hip joint yaw shaft speed reducer 52 are both made coaxial with the hip joint yaw shaft 18RZ.

An electric motor (hereinafter referred to as "hip joint redundant shaft motor) 54 that drives the hip joint redundant shaft 18RR is mounted on the first hip joint link 30R. The output of the hip joint redundant shaft motor 54 is transmitted to a speed reducer (hereinafter referred to as "hip joint redundant shaft speed reducer") 58 through a belt 56. The output shaft of the hip joint redundant shaft speed reducer 58 is situated or installed to be coaxial with the hip joint redundant shaft 18RR, so that the output reduced its speed by the hip joint redundant shaft speed reducer 58 is directly transmitted to the hip joint redundant shaft 18RR so as to rotate the first hip joint link 30R and the second hip joint link 32R relatively to one another about the pitch axis.

The hip joint redundant shaft motor 54 is mounted or situated at a position closer to the body 14 than the hip joint redundant shaft 18RR. The hip joint redundant shaft motor 54 is not therefore a subject of rotation of the hip joint redundant shaft 18RR. To go into further detail, the hip joint redundant shaft motor 54 is not a subject of rotation of except for the yaw axis, since no degree of freedom other than the yaw axis exists beyond the hip joint redundant shaft motor 54 in the direction of body 14. The inertial moment produced in the leg 12R can therefore be reduced when the hip joint redundant shaft 18RR is driven, in other words, when the robot 10 moves.

An electric motor (hereinafter referred to as "hip joint roll shaft motor") 60 that drives the hip joint roll shaft 18RX is mounted on the thigh link 16R. The output shaft of the hip joint roll shaft motor 60 is directly connected to a speed reducer (hereinafter referred to as "hip joint roll shaft speed reducer") 62 fastened on the thigh link 16R, so that output of the hip joint roll shaft motor 60 is directly transmitted to the hip joint roll shaft speed reducer 62.

The output shaft of the hip joint roll shaft speed reducer 62 is situated or installed to be coaxial with the hip joint roll shaft 18RX, so that the output reduced its speed by the hip joint roll shaft speed reducer 62 is directly transmitted to the hip joint roll shaft 18RX so as to rotate the second hip joint link 32R and the thigh link 16R relatively to one another about the roll axis. The hip joint roll shaft speed reducer 62 is configured so that its input shaft (i.e., the output shaft of the hip joint roll shaft motor 60) and output shaft are situated to be coaxial with each other. In other words, the output shafts of the hip joint roll shaft motor 60 and hip joint roll shaft speed reducer 62 are both made coaxial with the hip joint roll shaft 18RX.

An electric motor (hereinafter referred to as "hip joint pitch shaft motor") 66 that drives the hip joint pitch shaft 18RY is mounted on the thigh link 16R. The output of the hip joint pitch shaft motor 66 is transmitted to a speed reducer (hereinafter referred to as "hip joint pitch shaft speed reducer") 70 through a belt 68. The output shaft of the hip joint pitch shaft speed reducer 70 is situated or installed to be coaxial with the hip joint pitch shaft 18RY, so that the output reduced its speed by the hip joint pitch shaft speed reducer 70 is directly transmitted to the hip joint pitch shaft 18RY so as to rotate the second hip joint link 32R and thigh link 16R relatively to one another about the pitch axis.

Thus in this embodiment, the hip joint redundant shaft 18RR is installed or situated at a position closer to the body 14 than the hip joint roll shaft 18RX and hip joint pitch shaft 18RY, and the hip joint redundant shaft motor 54 is installed or situated at a position closer to the body 14 than the hip joint roll shaft motor 60 and hip joint pitch shaft motor 66. Therefore, the weight toward the distal end of the leg 12R can be reduced (the center of gravity of the leg 12R can be moved away from the distal end) so as to reduce the inertial moment produced in the leg during moving of the robot 10.

This will be explained more specifically. By situating the hip joint redundant shaft 18RR at a position closer to the body 14 than the hip joint roll shaft 18RX and hip joint pitch shaft 18RY, the number of members rotated by the hip joint redundant shaft 18RR (members from the second hip joint link 32R to the foot 24R) becomes larger than the number of members rotated by the hip joint roll shaft 18RX or hip joint pitch shaft 18RY (members from the thigh link 16R to the foot 24R). Since the hip joint redundant shaft motor 54 is therefore required to produce more driving power than the hip joint roll shaft motor 60 and hip joint pitch shaft motor 66, a larger and heavier motor should be used. The mounting of the heavy hip joint redundant shaft motor 54 at a position closer to the body 14 than the hip joint roll shaft motor 60 and hip joint pitch shaft motor 66 makes it possible to reduce weight toward the distal end of the leg 12R, thereby reducing the inertial moment produced in the leg 12R during moving of the robot 10.

The explanation of FIGS. 2 and 3 will be resumed. An electric motor (hereinafter referred to as "knee joint pitch shaft motor") 74 that drives the knee joint pitch shaft 22RY is mounted on the thigh link 16R. The output of the knee joint pitch shaft motor 74 is transmitted to a speed reducer (hereinafter referred to as "knee joint pitch shaft speed reducer") 78 through a belt 76. The output shaft of the knee joint pitch shaft speed reducer 78 is situated or installed to be coaxial with the knee joint pitch shaft 22RY, so that the output reduced its speed by the knee joint pitch shaft speed reducer 78 is directly transmitted to the knee joint pitch shaft 22RY so as to rotate the thigh link 16R and shank link 20R relatively to one another about the pitch axis.

An electric motor (hereinafter referred to as "ankle joint roll shaft motor") 80 that drives the ankle joint roll shaft 26RX is mounted on the shank link 20R. The output shaft of the ankle joint roll shaft motor 80 is directly connected to a speed reducer (hereinafter referred to as "ankle joint roll shaft speed reducer") 82 fastened to the shank link 20R, so that the output of the ankle joint roll axis motor 80 is directly transmitted to the ankle joint roll shaft speed reducer 82.

The output shaft of the ankle joint roll shaft speed reducer 82 is situated or installed to be coaxial with the ankle joint roll shaft 26RX, so that the output reduced its speed by the ankle joint roll shaft speed reducer 82 is directly transmitted to the ankle joint roll shaft 26RX so as to rotate the shank link 20R and foot 24R relatively to one another about the roll axis. The ankle joint roll shaft speed reducer 82 is configured so that its input shaft (i.e., the output shaft of the ankle joint roll shaft motor 80) and output shaft are situated to be coaxial with each other. In other words, the output shafts of the ankle joint roll shaft motor 80 and ankle joint roll shaft speed reducer 82 are both made coaxial with the ankle joint roll shaft 26RX.

An electric motor (hereinafter referred to as "ankle joint pitch shaft motor) 84 that drives the ankle joint pitch shaft 26RY is mounted on the shank link 20R. The output of the ankle joint pitch shaft motor 84 is transmitted to a speed reducer (hereinafter referred to as "ankle joint pitch shaft speed reducer") 88 through a belt 86. The output shaft of the ankle joint pitch shaft speed reducer 88 is situated or installed to be coaxial with the ankle joint pitch shaft 26RY, so that the output reduced its speed by the ankle joint pitch shaft speed reducer 88 is directly transmitted to the ankle joint pitch shaft 26RY so as to rotate the shank link 20R and foot 24R relatively to one another about the pitch axis.

Thus in the robot 10 according to this embodiment, each hip joint 18R, 18L comprises the hip joint yaw shaft 18RZ, 18LZ providing the degree of freedom to rotate about the yaw axis, the hip joint roll shaft 18RX, 18LX providing the degree of freedom to rotate about the roll axis, and the hip joint pitch shaft 18RY, 18LY providing the degree of freedom to rotate about the pitch axis, and additionally comprises the hip joint redundant shaft 18RR, 18LR providing the redundant degree of freedom to rotate about the pitch axis. Owing to this configuration, the movable range of the hip joints 18R, 18L is expanded to increase the amount of bending (the amount of bending forward and backward) of the body 14.

Figure 4:
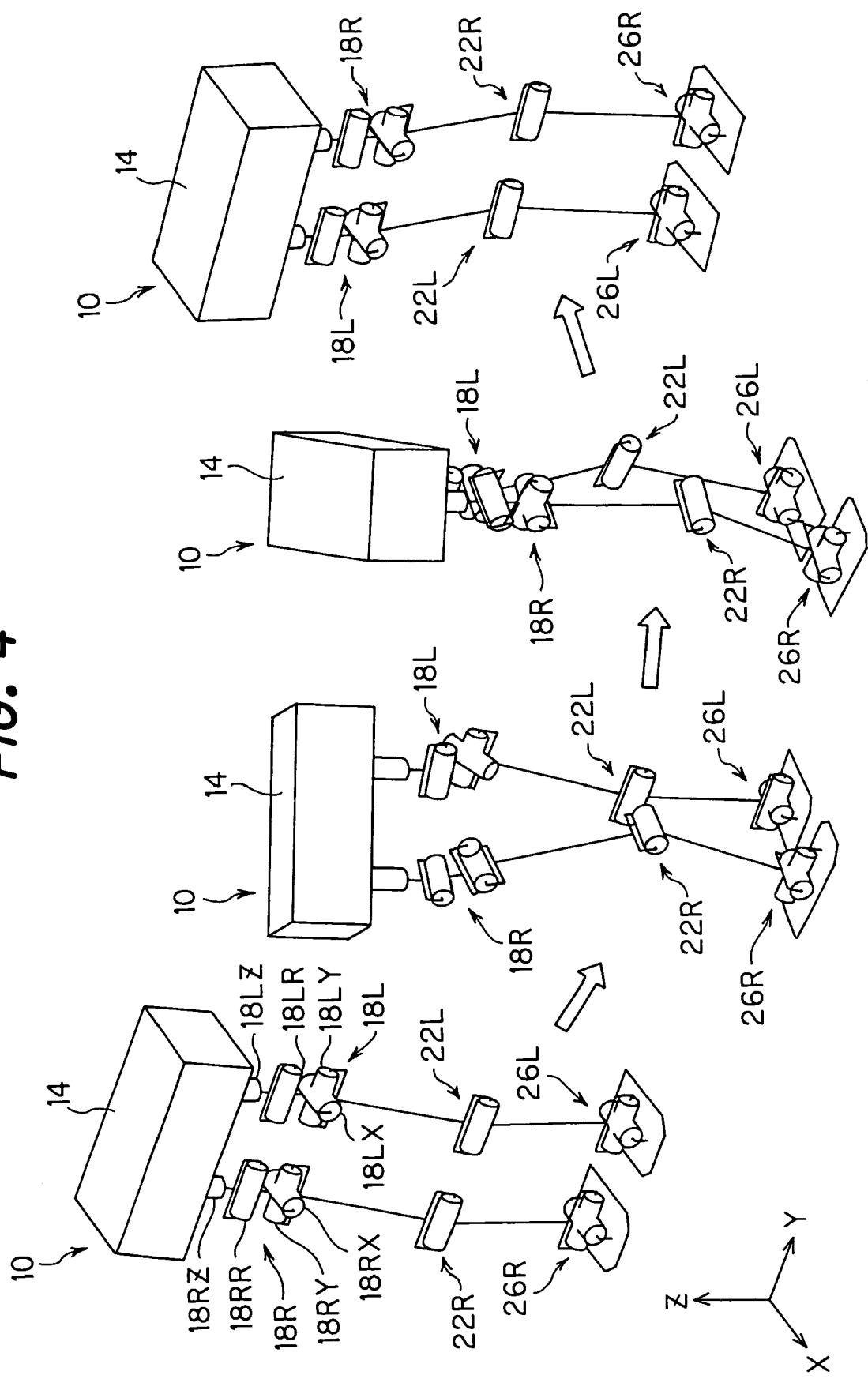
FIG. 4 is an explanatory view showing an example of a gait (knee-in turning) of the robot illustrated in FIG. 1.
Figure 5:
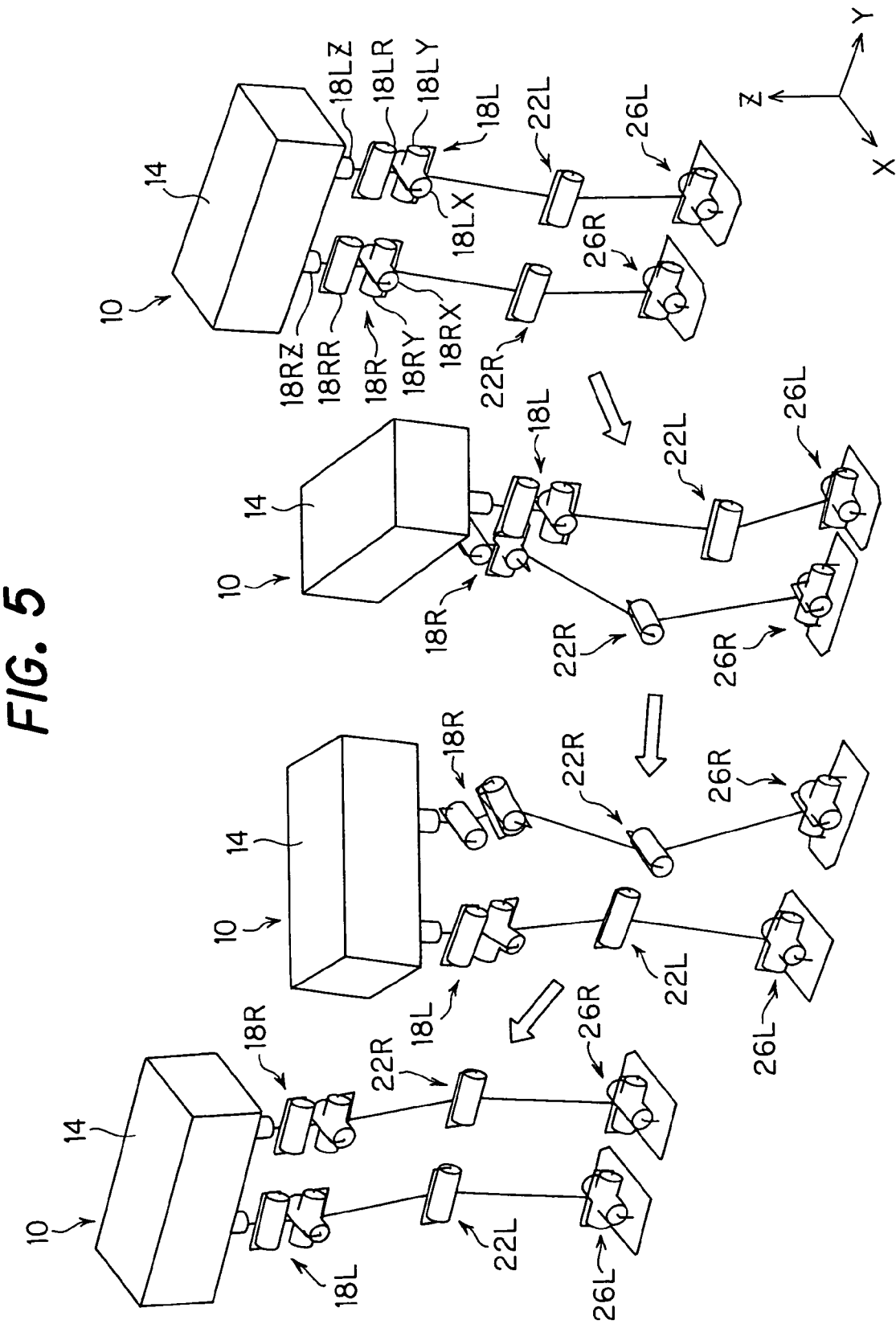
FIG. 5 is an explanatory view showing another gait (knee-out turning) of the robot illustrated in FIG. 1.

Moreover, the movable range of the legs 12R, 12L is expanded, thereby improving the degree of posture and gait freedom of the robot 10 to enable, for example, knee-in turning as shown in FIG. 4, knee-out turning as shown in FIG. 5, squatting and the like.

Further, owing to the fact that each hip joint roll shaft 18RX, 18LX and hip joint pitch shaft 18RY, 18LY are arranged to intersect at right angles or orthogonally, the hip joints 18R, 18L can be made compact despite the provision of the hip joint redundant shafts 18RR, 18LR.

Also noteworthy is that, unlike in the prior art, the ability of the body 14 to accommodate equipment internally is not decreased, since the body 14 is not divided. In addition, the provision of the hip joints 18R, 18L with the redundant degree of freedom makes it possible to expand the range of reach of the body 14 in comparison with the case of providing the body 14 with a joint (degree of freedom) and by this to expand the range of reach of arms attached to the body 14. This is because the provision of the hip joint redundant shafts 18RR, 18LR at positions near the other shafts of the hip joint has an effect similar to increase of flexibility in the case of a human being's body.

Figure 6:
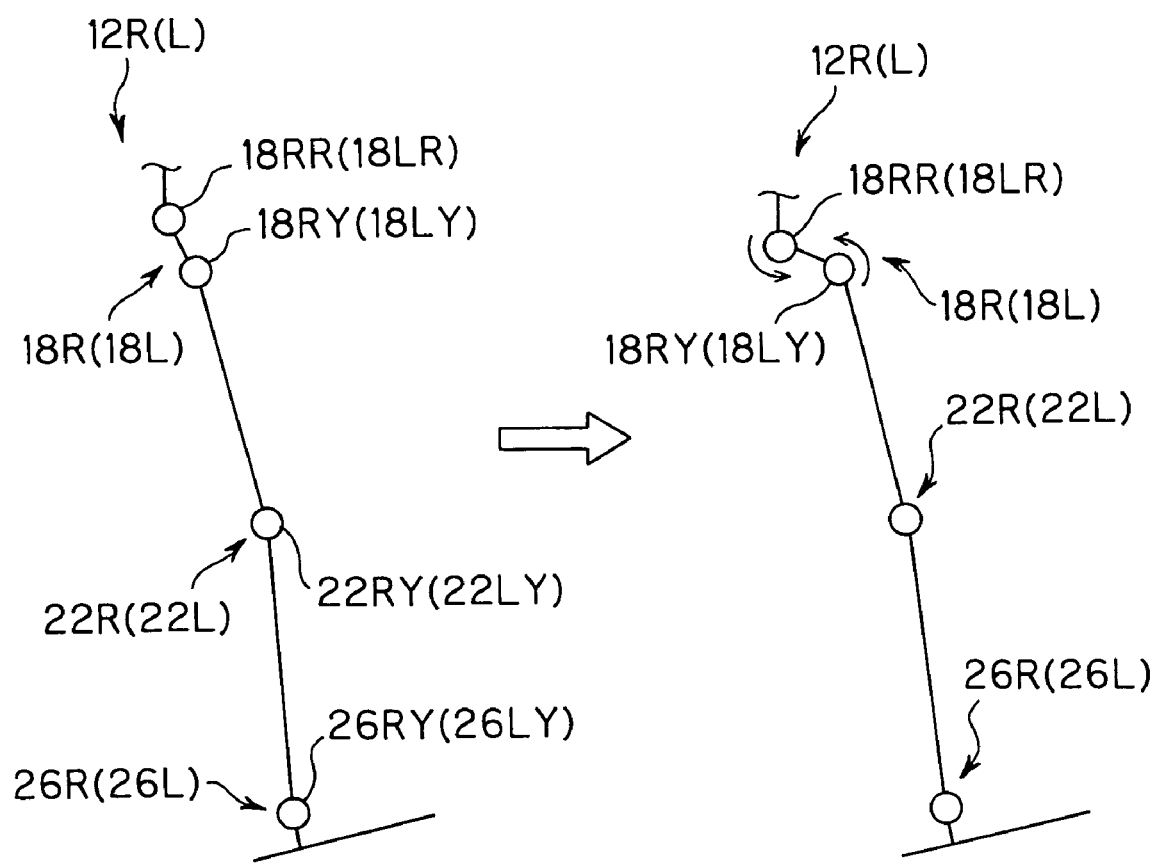
FIG. 6 is a view schematically showing an example of the driving directions of a hip joint pitch shaft and a hip joint redundant shaft when compliance capability is imparted to the legs of the robot shown in FIG. 1.

The leg 12R (12L) can be imparted with compliance capability by appropriately driving the hip joint pitch shaft 18RY (18LY), hip joint roll shaft 18RX (18LX) and hip joint redundant shaft 18RR (18LR) during landing of the leg 12R (12L), for example, by, as shown in FIG. 6, driving the hip joint pitch shaft 18RY (18LY) and hip joint redundant shaft 18RR (18LR) in opposite directions (rotate in the direction of contracting the hip joint 18R (18L)).

Figure 7:
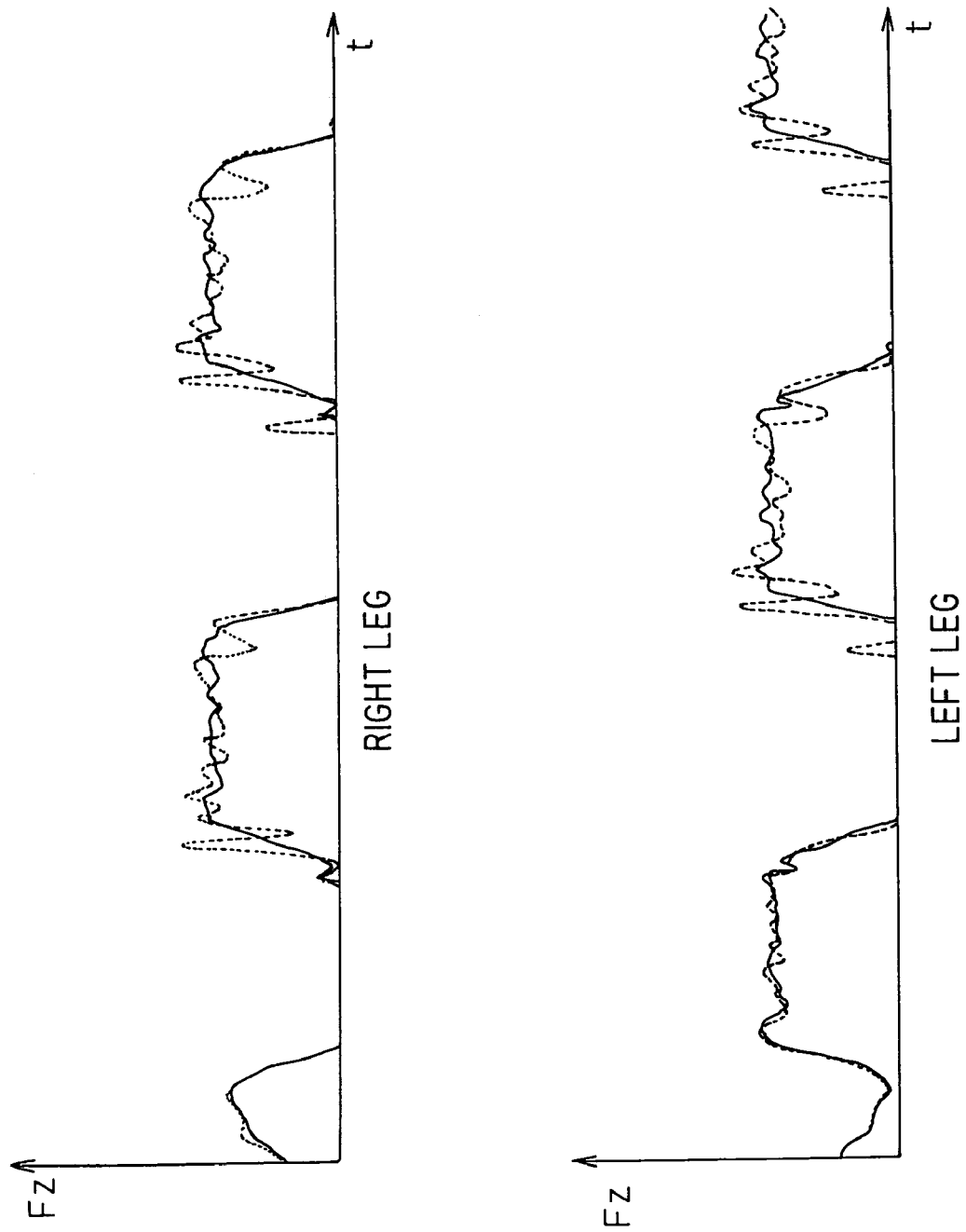
FIG. 7 is a set of graphs showing comparisons of ground impact force during footfall of the legs between the cases of driving and of not driving the hip joint pitch shaft and hip joint redundant shaft in opposite directions.

FIG. 7 is a set of graphs showing comparisons of the ground impact force during footfall of the legs 12R, 12L between the cases of driving (solid line curves), and of not driving (broken line curves), the hip joint pitch shafts 18RY, 18LY and the hip joint redundant shafts 18RR, 18LR in opposite directions. As can be seen from these graphs, when the hip joint redundant shafts 18RR, 18LR are provided and compliance capability is imparted, the ground impact force (specifically, the force acting in the Z-axis direction designated Fz above) can be quickly mitigated to enable stable walking or running.

When, as described in the prior art, the right and left legs are connected to the body by a parallel link mechanism, only one leg can be moved upward, which leads to the inconvenience that the ground impact force cannot be mitigated when, for example, the two legs land simultaneously. In contrast, in this embodiment, both the right and left hip joints 18R, 18L are provided with the hip joint redundant shafts 18RR, 18LR, so that the aforesaid inconvenience can be avoided by independently imparting each leg with compliance capability.

Further, as clearly shown in FIG. 2, the hip joint redundant shafts 18RR, 18LR are situated forward of the leg center axes 12RC, 12LC in the direction of forward movement of the robot 10 (forward in the direction of the X axis (roll axis)), thereby facilitating bending motion of the body 14.

Moreover, the heavy hip joint redundant shaft motors 54 are situated on the side opposite from the hip joint redundant shafts 18RR, 18LR in the roll axis direction (rearward thereof in the direction of forward movement of the robot 10), sandwiching the leg center axis 12RC (12LC) therebetween, so that the center of gravity balance of the legs 12R, 12L is improved despite the fact that the hip joint redundant shafts 18RR, 18LR are located forward of the leg center axes 12RC, 12LC. Further, owing to the positioning of the heavy hip joint redundant shaft motors 54 rearward in the direction of forward movement of the robot 10, the stability of the robot 10 when bending forward without leg-bending improves. In addition, no interference arises between the body 14 and hip joint redundant shaft motors 54 even when the body 14 bends sharply forward, so that a large amount of forward bending can be achieved.

In the case where the walking mode is made human-like biped walking as in the robot 10 according to this embodiment, it is more natural for the amount of forward bending to be larger than the amount of rearward bending, so the hip joint redundant shafts 18RR, 18LR are positioned forward and the hip joint redundant shaft motors 54 are positioned rearward. However, when it is desired to make the amount of rearward bending greater than the amount of forward bending, it suffices to position the hip joint redundant shafts 18RR, 18LR rearward and the hip joint redundant shaft motors 54 forward.

Moreover, the structure of the electric motor output transmission can be made compact, since the axis of the output shaft of each speed reducer that transmits motor output is made coaxial with the associated axis of rotation. Particularly noteworthy is that in the case of the hip joint yaw shafts 18RZ, 18LZ, hip joint roll shafts 18RX, 18LX and ankle joint roll shafts 26RX, 26LX, the axis of rotation, the axis of the electric motor and the axis of the speed reducer are in each instance all made coaxially aligned to enable direct connection without need to interpose other transmission elements, thereby enabling still further size reduction of the output transmission structure.

On the other hand, the hip joint pitch shafts 18RY, 18LY, hip joint redundant shafts 18RR, 18LR, knee joint pitch shafts 22RY, 22LY and ankle joint pitch shafts 26RY, 26LY require greater driving force than that required by the yaw shafts and roll shafts. The inputs to the speed reducers associated with these shafts are therefore increased or magnified by transmitting the outputs of the associated electric motors to the speed reducers through the belts (and pulleys of different diameter). The belt interconnecting each motor and the associated speed reducer transmits only relatively small driving force before speed reduction by the speed reducer, namely the motor output itself, so that it makes torque capacity small. It can therefore be a belt with a small torque capacity and, as such, can be a light-weight belt that is relatively small in both width and thickness. As a result, the belts do not cause a major increase in weight even if they are of extended in length owing to the distance between the motors and speed reducers being increased. Freedom in positioning the electric motors is therefore enhanced.

Figure 8:
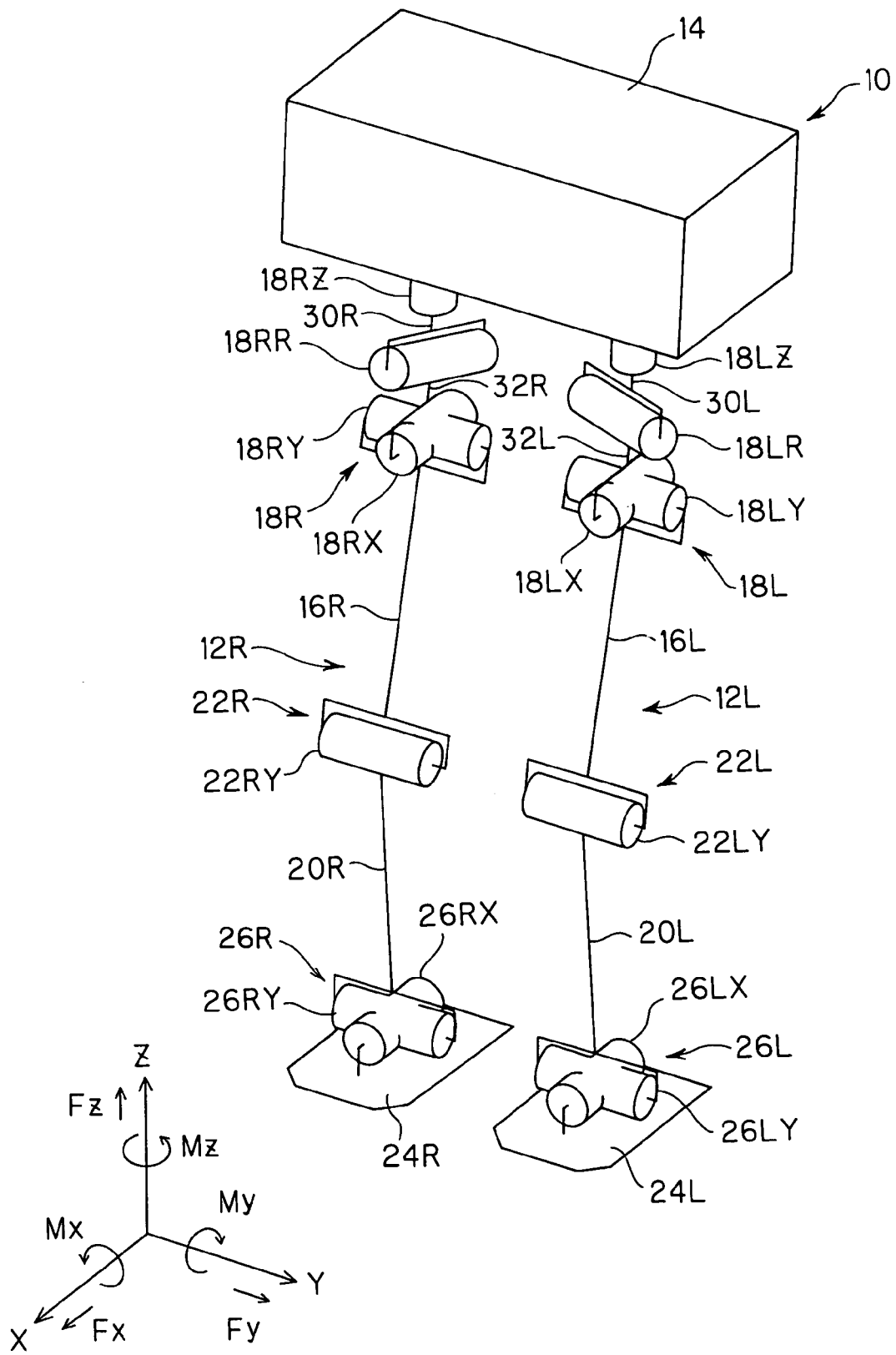
FIG. 8 is a schematic view similar to FIG. 1 showing an example in which the hip joint redundant shaft provides a degree of freedom to rotate about axes other than the pitch axis.

In the configuration described in the foregoing, the hip joint redundant shafts 18RR, 18LR each provides the degree of freedom to rotate about the pitch axis. However, a similar effect can also be achieved by any shaft not parallel to the yaw axis (Z axis; vertical direction), i.e., any shaft that changes the amount of bending of the body 14. Therefore, how the hip joint redundant shafts 18RR, 18LR are oriented should be appropriately determined taking into account the postures and gaits the robot 10 is required to achieve. FIG. 8 shows an example in which the hip joint redundant shafts 18RR, 18LR provide degrees of freedom to rotate about axes other than the pitch axes (provide degrees of freedom in the XY plane).

In the configuration described in the foregoing, the hip joint yaw shafts 18RZ, 18LZ are aligned with the center axes 12RC, 12LC of the legs. However, the hip joint yaw shafts 18RZ, 18LZ can instead be offset from the leg center axes 12RC, 12LC in the direction of roll axes. This makes it possible to minimize interference between the feet when the legs 12R, 12L are turned or rotated and to increase the angle of turning of the legs 12R, 12L.

In the configuration described in the foregoing, the electric motors and speed reducers associated with the hip joint redundant shafts 18RR, 18LR, hip joint pitch shafts 18RY, 18LY, knee joint pitch shafts 22RY, 22LY and ankle joint pitch shafts 26RY, 26LY are interconnected by the belts. Instead, however, it is possible to install the electric motors at the same positions as the axes of rotation and establish direct connections by aligning the output shaft of each electric motor coaxially with the axis of the speed reducer and the shafts.

In the configuration described in the foregoing, the hip joints 18R, 18L are structured to have the hip joint yaw shafts 18RZ, 18LZ, hip joint redundant shafts 18RR, 18LR, hip joint roll shafts 18RX, 18LX and hip joint pitch shafts 18RY, 18LY positioned in the order mentioned from the side of the body 14. However, the configuration should not be limited thereto.

As stated above, the embodiment of this invention is configured to have a legged mobile robot (10) equipped with legs (12R, 12L) each having a hip joint (18R, 18L) that connects a body (14) with a thigh link (16R, 16L), a knee joint (22R, 22L) that connects the thigh link with a shank link (20R, 20L), and an ankle joint (26R, 26L) that connects the shank link with a foot (24R, 24L) to move by driving each leg (12R, 12L), in which each of the hip joint (18R, 18L) comprises a first rotary shaft (hip joint yaw shaft 18RZ, 18LZ) that provides a degree of freedom to rotate about a yaw axis (Z axis), a second rotary shaft (hip joint roll shaft 18RX, 18LX) that provides a degree of freedom to rotate about a roll axis (X axis), and a third rotary shaft (hip joint pitch shaft 18RY, 18LY) that provides a degree of freedom to rotate about a pitch axis (Y axis), and in addition thereto, a fourth rotary shaft (hip joint redundant shaft 18RR, 18LR) that provides a redundant degree of freedom.

In addition, it is configured such that each of the hip joint (18R, 18L) is further equipped with a first member (first hip joint link 30R, 30L) that is connected to the body (14) through one of the first to third rotary shafts (hip joint yaw shaft 18RZ, 18LZ), and a second member (second hip joint link 32R, 32L) that is connected to the thigh link (16R, 16L) through others of the first to third rotary shafts (hip joint roll shaft 18RX, 18LX and hip joint pitch shaft 18RY, 18LY), and the first member (30R, 30L) and the second member (32R, 32L) are connected through the fourth rotary shaft (18RR, 18LR).

In addition, it is configured such that, the fourth rotary shaft (18RR, 18LR) is a shaft that is not parallel to the yaw axis (Z axis).

In addition, it is configured such that the fourth rotary shaft (18RR, 18LR) is situated forward of the first rotary shaft (18RZ, 18LZ) in a direction of the roll axis.

In addition, it is configured to further include a first rotary shaft motor (hip joint yaw shaft motor 50) that drives the first rotary shaft (18RZ, 18LZ) and a first rotary shaft speed reducer (hip joint yaw shaft speed reducer 52) that reduces an output of the first rotary shaft motor (50) in speed, and output shafts of the first rotary shaft motor and the first rotary shaft speed reducer are situated to be coaxial with the first rotary shaft (18RZ, 18LZ).

In addition, it is configured to further include a second rotary shaft motor (hip joint roll shaft motor 60) that drives the second rotary shaft (18RX, 18LX) and a second rotary shaft speed reducer (hip joint roll shaft speed reducer 62) that reduces an output of the second rotary shaft motor (60) in speed, and output shafts of the second rotary shaft motor and the second rotary shaft speed reducer are situated to be coaxial with the second rotary shaft (18RX, 18LX).

In addition, it is configured to further include a third rotary shaft motor (hip joint pitch shaft motor 66) that drives the third rotary shaft (18RY, 18LY) and a third rotary shaft speed reducer (hip joint pitch shaft speed reducer 70) that reduces an output of the third rotary shaft motor (66) in speed, and an output shaft of the third rotary shaft speed reducer is situated to be coaxial with the third rotary shaft (18RY, 18LY).

In addition, it is configured to further include a fourth rotary shaft motor (hip joint redundant shaft motor 54) that drives the fourth rotary shaft (18RR, 18LR), and the fourth rotary shaft motor is situated at a same position as the fourth rotary shaft (18RR, 18LR) or at a position closer to the body (14) than the fourth rotary shaft (18RR, 18LR).

In addition, it is configured to further include a fourth rotary shaft speed reducer (hip joint redundant shaft speed reducer 58) that reduces an output of the fourth rotary shaft motor in speed, and an output shaft of the fourth rotary shaft speed reducer is situated to be coaxial with the fourth rotary shaft (18RR, 18LR).

In addition, it is configured to further include a second rotary shaft motor (hip joint roll shaft motor 60) that drives the second rotary shaft (18RX, 18LX) and a fourth rotary shaft motor (hip joint redundant shaft motor 54) that drives the fourth rotary shaft (18RR, 18LR), and the second member (32R, 32L) is connected with the thigh link (16R, 16L) through at least the second rotary shaft (18RX, 18LX) such that the fourth rotary shaft motor (54) is situated toward a side of the body (14) from the second rotary shaft motor (60).

In addition, it is configured to further include a third rotary shaft motor (hip joint pitch shaft motor 66) that drives the third rotary shaft (18RY, 18LY) and a fourth rotary shaft motor (hip joint redundant shaft motor 54) that drives the fourth rotary shaft (18RR, 18LR), and the second member (32R, 32L) is connected with the thigh link (16R, 16L) through at least the third rotary shaft (18RY, 18LY) such that the fourth rotary shaft motor (54) is situated toward a side of the body (14) from the third rotary shaft motor (66).

In addition, it is configured such that the fourth rotary shaft motor (54) is situated on a side opposite from the fourth rotary shaft (18RR, 18LR) in the direction of the roll axis, sandwiching a center axis of the leg (12RC, 12LC) therebetween.

In addition, it is configured such that the first rotary shaft (18RZ, 18LZ) is offset relative to the center axis of the leg (12RC, 12LC) in the direction of the roll axis.

In addition, it is configured such that the second rotary shaft (18RX, 18LX) and the third rotary shaft (18RY, 18LY) intersect at right angles.

It should be noted in the above that, although a biped robot is taken as an example of the legged mobile robot, this invention can be applied to any type of robots if they move by their legs.

INDUSTRIAL APPLICABILITY

The legged mobile robot according to this invention is equipped with hip joints that connect the body and the thigh links have the first rotary shafts providing the degree of freedom to rotate about the yaw axis, the second rotary shafts providing the degree of freedom to rotate about the roll axis and the third rotary shafts providing the degree of freedom to rotate about the pitch axis, and further have the fourth rotary shafts providing the redundant degree of freedom. Owing to this configuration, the amount of bending of the body and the movable range of the legs are expanded to improve the degree of posture and gait freedom.

The invention claimed is:

1. A legged mobile robot equipped with legs each having a hip joint that connects a body with a thigh link, a knee joint that connects the thigh link with a shank link, and an ankle joint that connects the shank link with a foot to move by driving each leg, wherein each of the hip joint comprises a first rotary shaft that provides a degree of freedom to rotate about a yaw axis, a second rotary shaft that provides a degree of freedom to rotate about a roll axis, and a third rotary shaft that provides a degree of freedom to rotate about a pitch axis, a fourth rotary shaft that provides a redundant degree of freedom.

2. The robot according to claim 1, wherein each of the hip joint is further equipped with a first member that is connected to the body through one of the first to third rotary shafts, and a second member that is connected to the thigh link through others of the first to third rotary shafts, and the first member and the second member are connected through the fourth rotary shaft.

3. The robot according to claim 1, wherein the fourth rotary shaft is a shaft that is not parallel to the yaw axis.

4. The robot according to claim 1, wherein the fourth rotary shaft is situated forward of the first rotary shaft in a direction of the roll axis.

5. The robot according to claim 1, further including:

a first rotary shaft motor that drives the first rotary shaft and a first rotary shaft speed reducer that reduces an output of the first rotary shaft motor in speed, and output shafts of the first rotary shaft motor and the first rotary shaft speed reducer are situated to be coaxial with the first rotary shaft.

6. The robot according to claim 1, further including:

a second rotary shaft motor that drives the second rotary shaft and a second rotary shaft speed reducer that reduces an output of the second rotary shaft motor in speed, and output shafts of the second rotary shaft motor and the second rotary shaft speed reducer are situated to be coaxial with the second rotary shaft.

7. The robot according to claim 1, further including:

a third rotary shaft motor that drives the third rotary shaft and a third rotary shaft speed reducer that reduces an output of the third rotary shaft motor in speed, and an output shafts of the third rotary shaft speed reducer is situated to be coaxial with the third rotary shaft.

8. The robot according to claim 1, further including:

a fourth rotary shaft motor that drives the fourth rotary shaft, and the fourth rotary shaft motor is situated at a same position as the fourth rotary shaft or at a position closer to the body than the fourth rotary shaft.

9. The robot according to claim 8, further including:

a fourth rotary shaft speed reducer that reduces an output of the fourth rotary shaft motor, and an output shaft of the fourth rotary shaft speed reducer is situated to be coaxial with the fourth rotary shaft.

10. The robot according to claim 2, further including:

a second rotary shaft motor that drives the second rotary shaft and a fourth rotary shaft motor that drives the fourth rotary shaft, and the second member is connected with the thigh link through at least the second rotary shaft such that the fourth rotary shaft motor is situated toward a side of the body from the second rotary shaft motor.

11. The robot according to claim 2, further including:

a third rotary shaft motor that drives the third rotary shaft and a fourth rotary shaft motor that drives the fourth rotary shaft, and the second member is connected with the thigh link through at least the third rotary shaft such that the fourth rotary shaft motor is situated toward a side of the body from the third rotary shaft motor.

12. The robot according to claim 8, wherein the fourth rotary shaft motor is situated on a side opposite from the fourth rotary shaft in the direction of the roll axis, sandwiching a center axis of the leg therebetween.

13. The robot according to claim 1, wherein the first rotary shaft is offset relative to the center axis of the leg in the direction of the roll axis.

14. The robot according to claim 1, wherein the second rotary shaft and the third rotary shaft intersect at right angles.

* * * * *